Oct. 13, 1964    L. H. SCHULMAN ETAL    3,152,732
DISPOSABLE LAWN SPREADER
Filed March 22, 1962    2 Sheets-Sheet 1
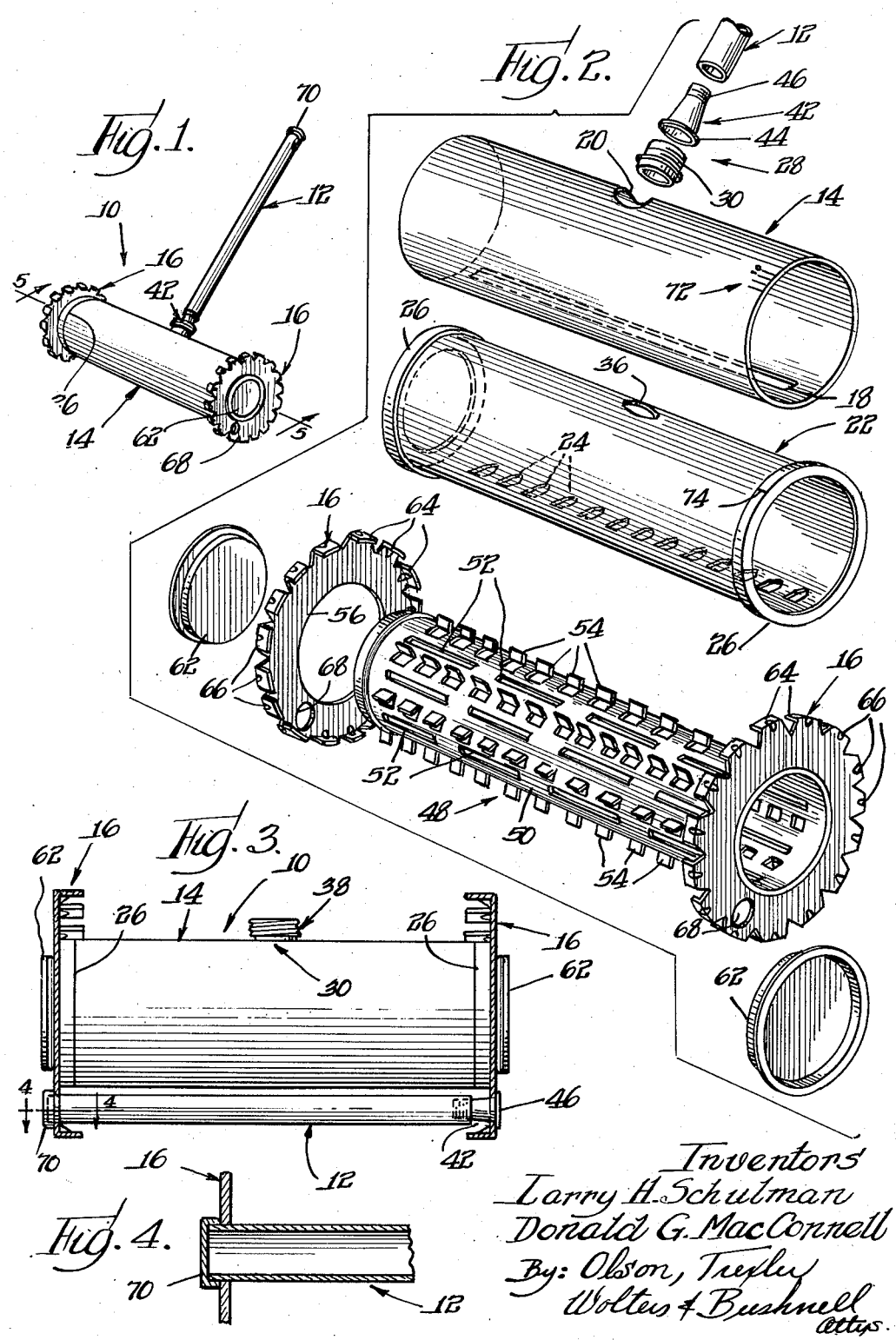
Inventors
Larry H. Schulman
Donald G. MacConnell
By: Olson, Trexler,
Wolters & Bushnell
attys.

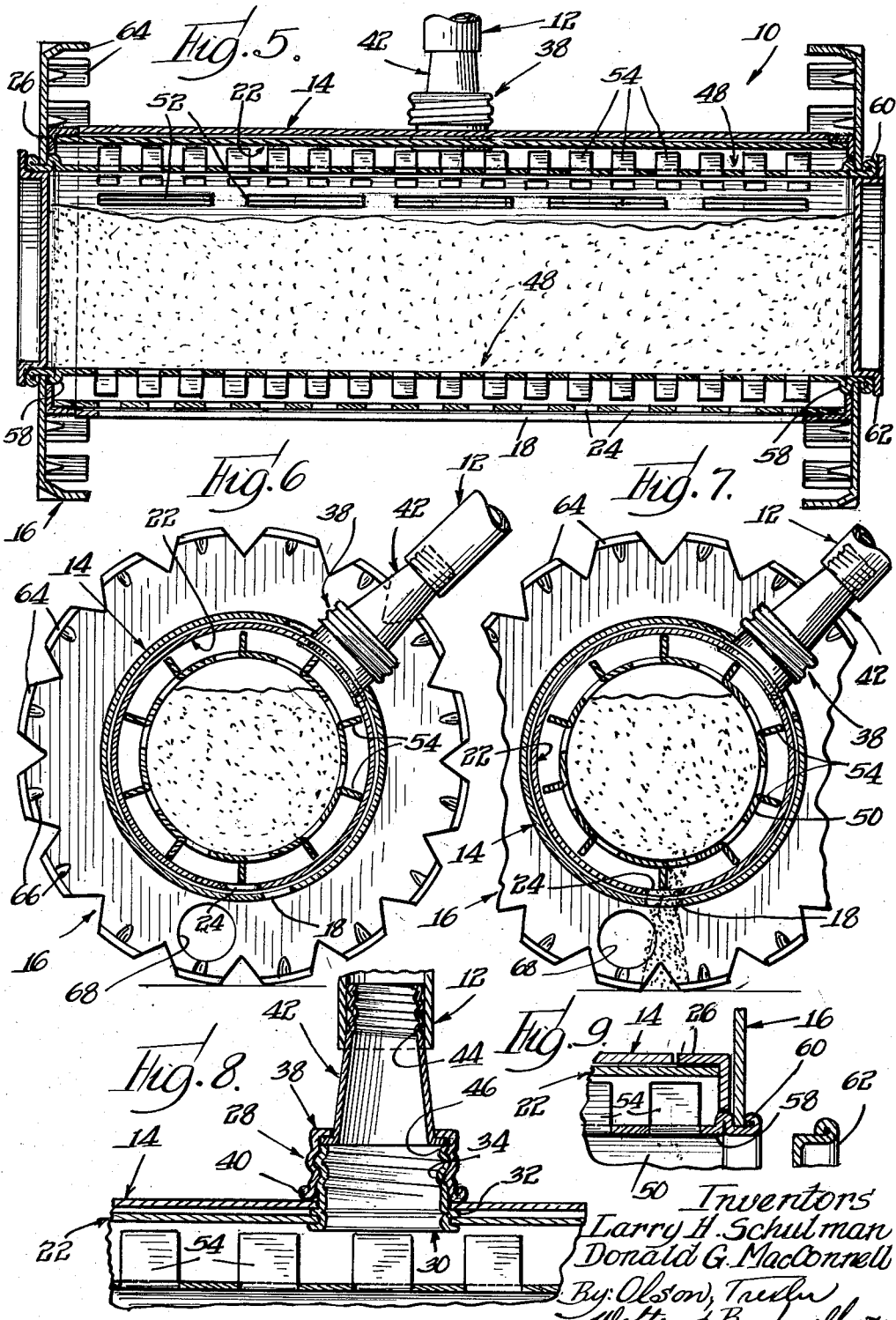

United States Patent Office 3,152,732
Patented Oct. 13, 1964

3,152,732
DISPOSABLE LAWN SPREADER
Larry H. Schulman, 130 Washington Blvd., Hoffman Estates, Roselle, Ill., and Donald G. MacConnell, 6207 N. Moody Ave., Chicago 46, Ill.
Filed Mar. 22, 1962, Ser. No. 181,650
6 Claims. (Cl. 222—169)

This invention relates generally to domestic lawn and gardening equipment and more particularly to apparatus for spreading grass seed, granular fertilizers and analogous materials on a ground surface.

According to conventional practice, spreader devices of the type described comprise a relatively large trough having a discharge opening at the bottom. A rotary blade assembly is directed to operate adjacent the opening for insuring uniform dispensing of the material to be spread; and this rotary assembly is customarily connected to rubber tired wheels for motive power. The entire apparatus is constructed for many years of service, being generally adapted to have a capacity and a range of delivery rates appropriate to rather ample sized residential properties. Furthermore, the material which it is desired to spread must be purchased separately and stored by the homeowner in anticipation of his requirements. Homeowners with small properties have found the expense and inconvenience of these customary spreader devices discouraging and, accordingly, frequently forego the advantages of uniformly distributing grass seed, granular fertilizers and the like. In addition, homeowners desiring to reseed to small area of a lawn almost universally spread the seed by hand, and as a consequence, much seed is wasted in the application of excessive quantities. Such later tasks are thereby unnecessarily expensive.

Therefore, an important object of the present invention is to provide a new and improved spreader device.

Another object of the invention is to provide a self-contained spreader device which may be discarded after use.

Still another object of the invention is to provide a spreader device which is inexpensive to produce.

A further object of the invention is to provide a spreader device which is compact to ship and handle.

These and other objects and features of the invention will become more apparent upon a reading of the following descriptions.

Apparatus in accord with the invention includes a first cylindrical shell adapted to be held against rotation and having a slot adapted to confront a ground surface; a tubular distributing member rotatably mounted in the shell, the distributing member being adapted to contain a particulate material to be dispensed and having radially opening ports for discharging the particulate material to the vicinity of the slot; ground engaging wheels on opposite ends of the distributing member in driving relationship therewith; and a second cylindrical shell closely adjacently disposed inside the first cylindrical shell to be relatively rotatably positioned therewith, the second shell having a plurality of axially aligned and spaced-apart openings adjustably registrable with the slot of the first shell for controlling the dispensing of the particulate material.

In order that the principle of the invention may be readily understood, a single embodiment thereof, but to which the application is not to be restricted, is shown in the accompanying drawings wherein:

FIG. 1 is a perspective view of a spreader device constructed in accordance with the invention and shown assembled for use;

FIG. 2 is an enlarged, exploded perspective view of the components of the spreader device of FIG. 1;

FIG. 3 is an enlarged, elevational view of the spreader device of FIG. 1, showing the device assembled for shipping and retailing;

FIG. 4 is an enlarged view taken along the line 4—4 of FIG. 3;

FIG. 5 is an enlarged view taken along the line 5—5 of FIG. 1;

FIG. 6 is an enlarged, cross-sectional view taken in end elevation and showing the two shells of the spreader device rotated to preclude discharge of the particulate material;

FIG. 7 is a view similar to the showing of FIG. 6 but illustrating the two shells rotated relative to each other so as to provide for a controlled discharge of the particulate material;

FIG. 8 is an enlarged elevational view of the fitting means for positioning the shells with respect to each other and for use in attaching a handle to the spreader device; and FIG. 9 is an enlarged, fragmentary front elevational view showing the assembly of the two shells and one of the wheels of the spreader device of the invention.

Referring now in detail to the drawings, specifically to FIG. 1, a spreader device indicated generally by the numeral 10 will be seen to include a releasibly attached handle member 12, a cylindrical shell 14 and a pair of ground engaging wheels 16. Turning to FIG. 2, the cylindrical shell 14 will be seen fabricated as a thinwall member fashioned from paperboard or some other suitable, inexpensive material. An axially extending slot 18 is provided in the shell 14 in a position which is intended to confront a ground surface during use of the spreader device. The shell 14 is also fashioned with a radially opening aperture 20 which is made ovoid or enlarged along the circumference of the shell for purposes which will be brought out more fully hereinafter.

In accordance with a feature of the invention, a second cylindrical shell 22 is assembled with the shell 14 closely adjacently disposed inside that shell. In addition, shell 22 is selected to take an outside diameter slightly less than the inside diameter of shell 14 in order that the shells may be relatively rotatably positioned with respect to each other. Shell 22 is fabricated from a material similar to that from which shell 14 is fabricated, and shell 22 is provided with a series of axially aligned and spaced-apart openings 24 which are adapted to be adjustably registrable with the slot 18 in shell 14.

A pair of lightweight, metal end rings 26 are mounted to shell 22; and with reference to FIGS. 5 and 9, the thickness of the material of rings 26 will be seen to permit the edge of the ring to abut the end edges of shell 14 whereby to confine shell 14 between the opposite end rings 26. Therefore, in assembly of the shells 14 and 22, one of the end rings 26 is attached to shell 22 employing for example an interference fit; and thereafter, the shell 14 is slipped over the shell 22 and the remaining end ring 26 fitted in place.

In accordance with the invention, the shells 14 and 22 are intended to be releasably positionable with respect to each other; and considering FIGS. 2 and 8, a fitting unit 28 will be seen provided for this purpose. The fitting unit 28 includes a collar 30 having a radial flange 32 and a threaded body 34. A sleeve portion of the collar 30 is inserted in an aperture 36 fashioned in shell 22, and the end edge of this sleeve portion is formed over as is shown in FIG. 8 to trap the material of shell 22 against the flange 32. The threaded body 34 of collar 30 extends through the aperture 20 fashioned in shell 14 to receive a cooperatively threaded cap 38. The lower edges of cap 38 are curled to form a lip 40 which holds the material of shell 14 against the flange 32 upon progressive engagement of collar 30 and cap 38.

The fitting unit 28 additionally includes a handle-attaching member 42 having an externally threaded portion 44 at one end and a radial flange 46 at the other. As is particularly well shown in FIG. 8, the cap 38 is provided with a central aperture for passing the body of member 42, the aperture in cap 38 having edges which trap the flange 46 against the top edge of collar 30 in securing the member 42 to the spreader device of the invention.

Collar 30, cap 38 and member 42 are desirably fabricated as extruded metal fittings or as parts fabricated from a resinous plastic material. Furthermore, the handle 12 is desirably fabricated as a paperboard tube in order that the threaded end 44 of member 42 can readily form threads internally of the tubular handle when the same is turned over the end 44 in attaching the handle to the spreader device. The length of handle 12 is selected to approximate the spacing between wheels 16 for purposes to be described hereinafter.

A tubular distributing member indicated generally by the numeral 48 in FIG. 2 is attached to the wheels 16 in order to be rotatably mounted inside shell 22 coaxially therewith. The member 48 includes a tubular body 50 which is adapted to contain a quantity of a particulate material which it is desired to dispense with the spreader device 10; and in order to provide for ready discharge of the particulate material, the tubular body 50 is fashioned with a number of radially opening ports 52. In addition, a number of arcuately spaced series of agitating fingers 54 are struck up from the body 50, the vacated portions thus develop providing auxiliary ports for discharging the contents of the tubular body 50. Since the distributing member 48 is intended to rotate within the shell 22, the diameter of the tubular body 50 and the radial extent of the fingers 54 is selected to avoid contact with the shell 22 as is well shown in FIGS. 6 and 7.

In order to mount the wheels 16 to the tubular body 50, the wheels are fashioned with central apertures 56 as is shown in FIG. 2; and these apertures 56 are adapted to receive the ends of the tubular body 50. With reference to FIGS. 5 and 9, the ends of the body 50 will be seen provided with circumferential beads 58 which obstruct passage of the wheels 16 axially inwardly therefrom; and in assembly of the spreader device 10, the tubular body 50 is inserted in the assembled shells 14 and 22 whereupon the wheels 16 are fitted over the ends of the tubular body 50 to abut the beads 58. Thereafter, the end edges of the tubular body 50 are curled to form lips 60 which confine the wheels against the beads 58, as is shown in FIG. 5. Hub caps 62 are intended to be inserted in the ends of tubular body 50 with an interference fit therebetween in order to closure the spreader device and contain the particulate material filled into the body 50. Wheels 16, body 50 and hub caps 62 are advantageously fabricated as metal stampings.

As is well shown in FIG. 2, each of the wheels 16 includes a peripheral series of right angular lugs 64; and in order to strengthen the lugs 64, dimples 66 are provided at the bend of each lug. Moreover, the wheels 16 are fashioned with eccentric apertures 68 which are axially aligned in assembly of the spreader device. The apertures 68 are intended to be used in mounting handle 12 to the remainder of the spreader device for shipping and retailing as is shown in FIG. 3. There, a cap 70 will be seen fitted on one end of the handle 12; and the handle will be seen inserted through one of the apertures 68 and into juxtaposition with the other of the apertures 68. The member 42 may be used in completing the attachment of the handle as is shown, flange 46 of the member 42 confronting the edges of one of the apertures 68 and the threaded end of the member 42 engaging the interior of the tubular handle 12. A highly compact unit for shipping and handling results.

Having thus described one construction of the invention, it is important now to state how the illustrated embodiment operates. Assuming that the spreader device 10 has been filled with an appropriate particulate material such as grass seed or granular fertilizer and assuming that the spreader device is in its shipping configuration shown in FIG. 3, preparation of the device for use proceeds as follows.

The handle 12 will be removed from its storage position by loosening the member 42, and removing the member 42 and the handle 12 from their attached condition with respect to the wheels 16. The cap 38 will also be loosened and removed from collar 30, and the member 42 will be disposed in place as is shown in FIG. 8. The shell 14 will then be rotated relative to the shell 22 from the position shown in FIG. 6 in which the apertures 24 are completely out of registration with slot 18 into the condition shown in FIG. 7 where a selected registration of the apertures 24 and the slot 18 has been achieved. Thereupon, the cap 38 will be tightened over collar 30, positioning the shells 14 and 22 in the desired registration.

Advantageously, suitable indicia 72 are printed or scribed on the exterior surface of shell 14, and a cooperating mark 74 is provided on the adjacent end ring 26 in order to give a visual indication of the degree of registration of apertures 24 and slot 18.

Finally, the handle 12 is turned on the threaded end portion of member 42 as is shown in FIG. 8, and the spreader device is ready for use as is shown in FIG. 1.

To spread the particulate contents of the device, it is only necessary to push the device over the ground surface, manually directing the device using the handle 12. Because of its connection to the shells 14 and 22, the handle will hold the shells against rotation; and the force supplied to the spreader device will result in wheels 16 rotating over the ground surface and turning the tubular body 50 within the shells 14 and 22. The particulate material will flow through the ports 52 and through the auxiliary ports adjacent the fingers 54 into the annular space between the tubular body 50 and the shell 22 to be distributed over the apertures 24 by the fingers 54 in a uniformly flowing discharge. This is indicated generally in FIG. 7.

After the contents of the spreader device have been exhausted, the device can be discarded without further thought or attention.

The specific example herein shown and described should be considered as being illustrative only. Various changes may occur to those skilled in the art; and these changes are to be understood as forming a part of this invention insofar as they fall within the spirit and scope of the appended claims.

The invention is claimed as follows:

1. A disposable spreader device comprising: a cylindrical shell adapted to be held against rotation and having an axially extending slot adapted to confront a ground surface; a hollow tubular distributing member rotatably mounted in said shell, said distributing member being adapted to contain a particulate material to be dispensed and having radially opening ports for discharging said particulate material to said slot; ground engaging wheels on opposite ends of said distributing member in driving relationship therewith; and a second cylindrical shell closely adjacently disposed inside said first mentioned cylindrical shell to be relatively rotatably positioned therewith, said second shell having a plurality of axially aligned and spaced-apart openings adjustably registrable with the slot of said first shell for controlling the dispensing of said particulate material.

2. A disposable spreader device comprising: a cylindrical shell adapted to be held against rotation and having an axially extending slot adapted to confront a ground surface; a tubular distributing member rotatably mounted in said shell, said distributing member being adapted to contain a particulate material to be dispensed and having radially opening ports for discharging said particulate material to said slot; ground engaging wheels on opposite ends of said distributing member in driving relationship therewith; a second cylindrical shell closely adjacently disposed inside said first mentioned cylindrical shell and interjacent said distributing member and said first mentioned shell to be relatively rotatably positioned with respect to said first shell, said second shell having a plurality of axially aligned and spaced-apart openings adjustably registrable with the slot of said first shell for controlling dispensing of said particulate material; fitting means releasably positioning said second shell with respect to said first shell and defining a handle-attaching formation; and a handle releasably attachable to said formation.

3. A disposable spreader device according to claim 2 wherein the length of said handle approximates the spacing between said wheels and wherein means are included for mounting said handle to said wheels parallel with said shells for shipment and handling of said spreader device.

4. A disposable spreader device as set forth in claim 1 wherein said wheels are positioned closely adjacent to and form end closure means for the first mentioned cylindrical shell.

5. A disposable spreader device as set forth in claim 4 wherein said wheels are secured to the ends of said tubular distributing member and form end closure means therefor.

6. A disposable spreader device comprising: a cylindrical shell adapted to be held against rotation and having axially disposed opening means adapted to confront a ground surface; a distributing member rotatably mounted in said shell and adapted to distribute particulate material to the vicinity of said opening means for exit of said particulate material through said opening means; ground engaging wheels at opposite ends of said cylindrical shell and drivingly connected to said distributing member; a second cylindrical shell closely adjacently disposed coaxially within said first mentioned cylindrical shell and between said distributing member and said first mentioned shell and relatively rotatable with respect to the first mentioned shell, said second shell having axially disposed opening means selectively registrable with the opening means of the first mentioned shell or non-registrable in accordance with the relative rotatable position of the first and second shells for controlling dispensing of said particulate material; a handle engagable by the hand to move said spreader device along the ground; and means coacting between said handle and said first and second shells to mount said handle on said shells and to lock said shells in selected relative rotatable position.

References Cited in the file of this patent

UNITED STATES PATENTS

| | | |
|---|---|---|
| 1,022,062 | Christopher | Apr. 12, 1912 |
| 2,761,589 | Stach | Sept. 4, 1956 |
| 2,832,509 | Emanatian | Apr. 29, 1958 |